(12) United States Patent
Oshima et al.

(10) Patent No.: US 8,151,287 B2
(45) Date of Patent: Apr. 3, 2012

(54) OPTICAL PICKUP FEED DEVICE FOR SLIDING OPTICAL PICKUP

(75) Inventors: Noriyo Oshima, Osaka (JP); Yasuhiro Shinkai, Kawagoe (JP); Kuniya Satomi, Kawagoe (JP); Kazuyoshi Sato, Tendo (JP); Yuji Ando, Kawagoe (JP); Atsushi Shibuya, Kawagoe (JP)

(73) Assignees: Pioneer Corporation, Tokyo (JP); Tohoku Pioneer Corporation, Yamagata (JP)

( * ) Notice: Subject to any disclaimer, the term of this patent is extended or adjusted under 35 U.S.C. 154(b) by 631 days.

(21) Appl. No.: 12/089,482

(22) PCT Filed: Sep. 28, 2006

(86) PCT No.: PCT/JP2006/319292
§ 371 (c)(1),
(2), (4) Date: May 12, 2009

(87) PCT Pub. No.: WO2007/040136
PCT Pub. Date: Apr. 12, 2007

(65) Prior Publication Data
US 2009/0249379 A1    Oct. 1, 2009

(30) Foreign Application Priority Data
Oct. 6, 2005    (JP) .................... 2005-294210

(51) Int. Cl.
*G11B 17/30*    (2006.01)
*G11B 21/02*    (2006.01)
*G11B 21/16*    (2006.01)

(52) U.S. Cl. ......... 720/664; 720/663; 720/676; 720/689
(58) Field of Classification Search .................. 720/658, 720/672, 674, 675, 677, 679, 681, 682, 686, 720/687, 688, 692, 693, 663, 664, 676, 689; 369/44.14, 244.1, 249.1, 220, 223
See application file for complete search history.

(56) References Cited

U.S. PATENT DOCUMENTS 5,831,962 A * 11/1998 Sakai et al. ............... 720/672
6,597,652 B2 * 7/2003 Obara ..................... 720/675

FOREIGN PATENT DOCUMENTS

| JP | 01-106371 A | 4/1989 |
| JP | 9-297973 A | 11/1997 |
| JP | 2002-352531 A | 12/2002 |

* cited by examiner

*Primary Examiner* — Will J Klimowicz
(74) *Attorney, Agent, or Firm* — Sughrue Mion, PLLC

(57) ABSTRACT

The present invention is to provide a pickup feed device to accurately position an optical pickup in place with miniaturization. The pickup device includes a lead screw attached to a movable chassis, a pickup portion, a rack member, a torsion coil spring, a projection portion, and a recess portion. The pickup portion has a case receiving the pickup. The rack member is fixed to the case. The rack portion disposed on a rack one end portion and a case one end portion are engaged with the lead screw. A rack another end portion has the abut portion abutting an inner edge portion of the movable chassis. The torsion coil spring urges the abut portion toward a case another end portion. The projection portion is disposed on the abut portion and the recess portion is disposed on the case another end portion.

9 Claims, 6 Drawing Sheets

OPTICAL PICKUP FEED DEVICE FOR SLIDING OPTICAL PICKUP

CROSS REFERENCE TO RELATED APPLICATIONS

This application is a National Stage of International Application No. PCT/JP2006/319292 filed on Sep. 28, 2006, claiming priority based on Japanese Patent Application No. 2005-294210, filed Oct. 6, 2005, the contents of all of which are incorporated herein by reference in their entirety.

TECHNICAL FIELD

The present invention relates to a pickup feed device for sliding an optical pickup to read information from a recording medium.

RELATED ART

A reproducing apparatus to reproduce information recorded in an optical disk such as a CD (compact disk) includes an optical pickup to read out the information and a pickup feed device, hereafter referred to as feed device, to move the optical pickup in a radial direction of the optical disk.

The feed device includes a screw axle extending along in a radial direction of the optical disk and rotatably driven by a motor, a guide rod disposed spaced apart from and parallel to the screw axle, a case receiving the optical pickup, a rack member attached to the case, one end portion of the rack member engaging with the screw axle and another end portion thereof contacting the guide rod, and a spring member urging the another end portion of the rack member toward the guide rod.

In the conventional feed device, a spring member urges the another end portion of the rack member toward the guide rod so as to avoid movement of the rack member, or the case attached with the rack member. The feed device moves the case, or the optical pickup in the radial direction of the optical disk with rotational movement of the screw axle.

The conventional feed device is designed such that the rack member and the case are fixed to a side of the one end portion of the rack member to minimize the rack member and the case. When the case, or the optical pickup moves, the another end portion of the rack member moves with a delay with respect to the one end portion of the rack member due to a frictional force between the rack member and the guide rod. It is apparent that the case also follows the same behavior as the rack member.

The conventional feed device has a difficulty to precisely position the optical pickup at a desired position.

DISCLOSURE OF THE INVENTION

An object of the present invention is to provide a pickup feed device including a screw axle, a guide portion disposed spaced apart from the screw axle, a case receiving an optical pickup, a rack portion attached to the case and engaging with the screw axle, an abut portion attached to the case and in contact with the guide portion, and an urging means to urge the abut portion toward the guide portion and the case.

BEST MODE FOR CARRYING OUT THE INVENTION

Figure 1:
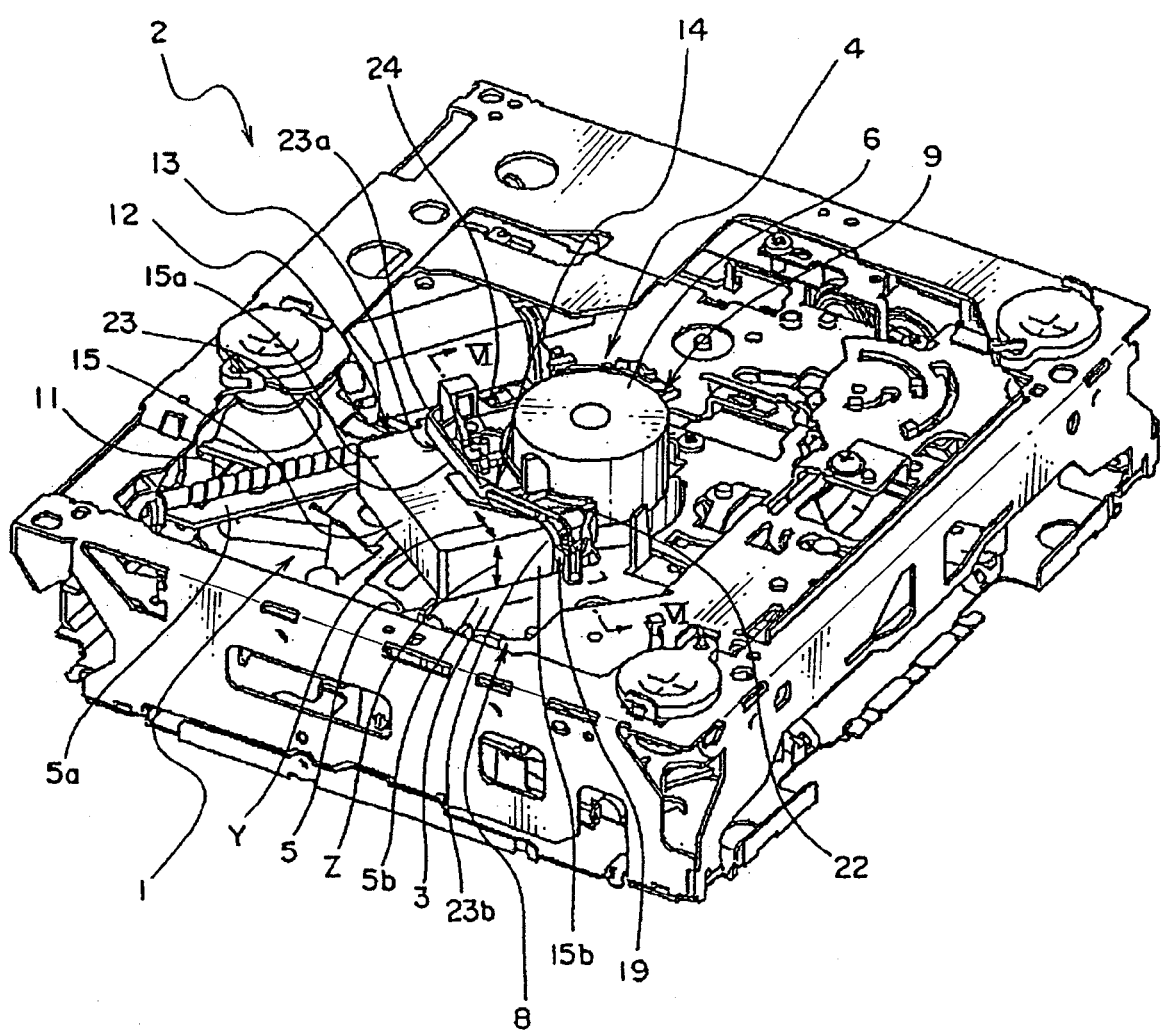
FIG. 1 is a perspective view of an embodiment of a pickup feed device of the present invention.
Figure 2:
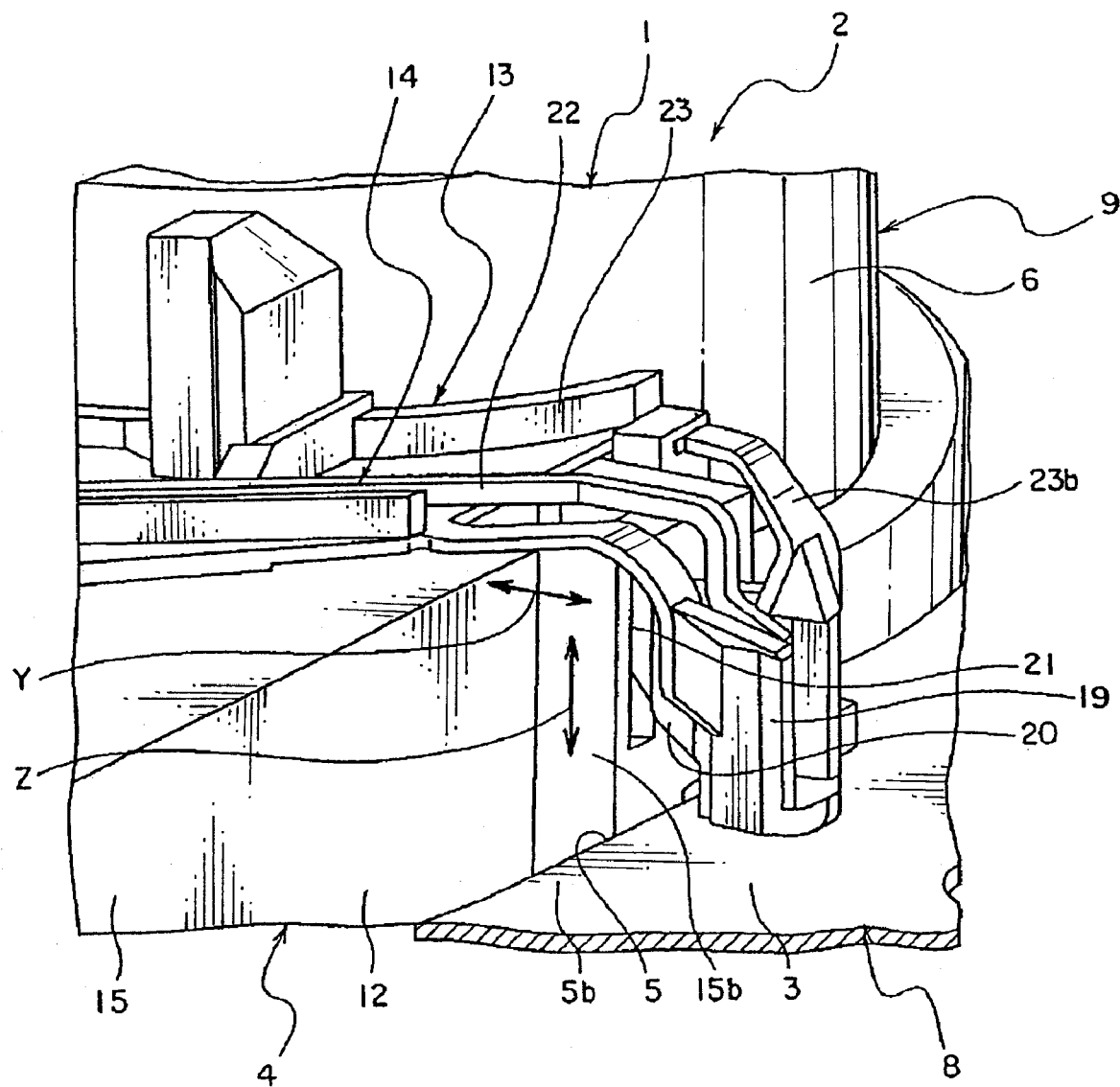
FIG. 2 is an enlarged perspective view of an essential part of the pickup feed device of FIG. 1.
Figure 3:
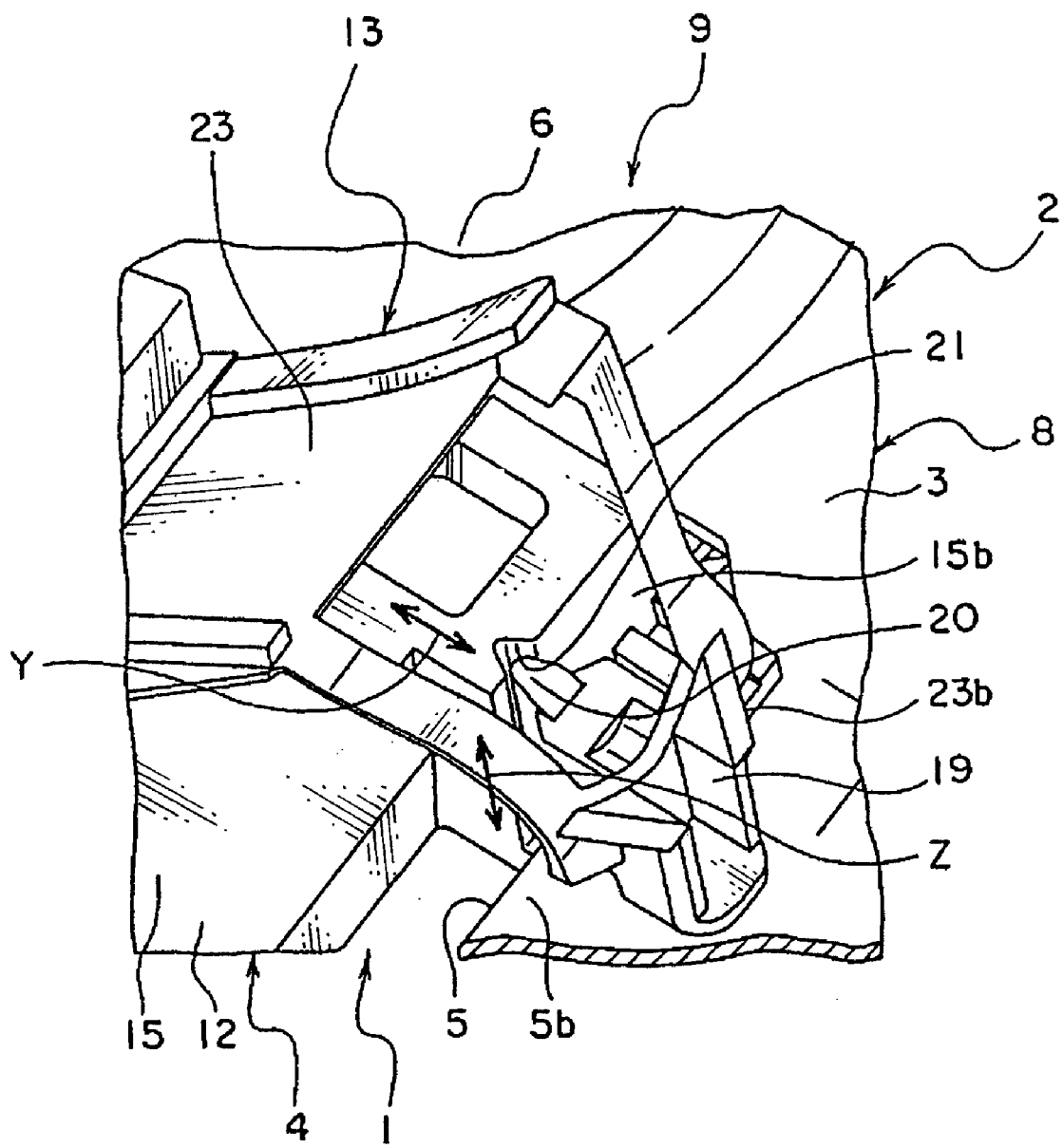
FIG. 3 is an enlarged perspective view of the essential part of the pickup feed device of FIG. 2.
Figure 4:
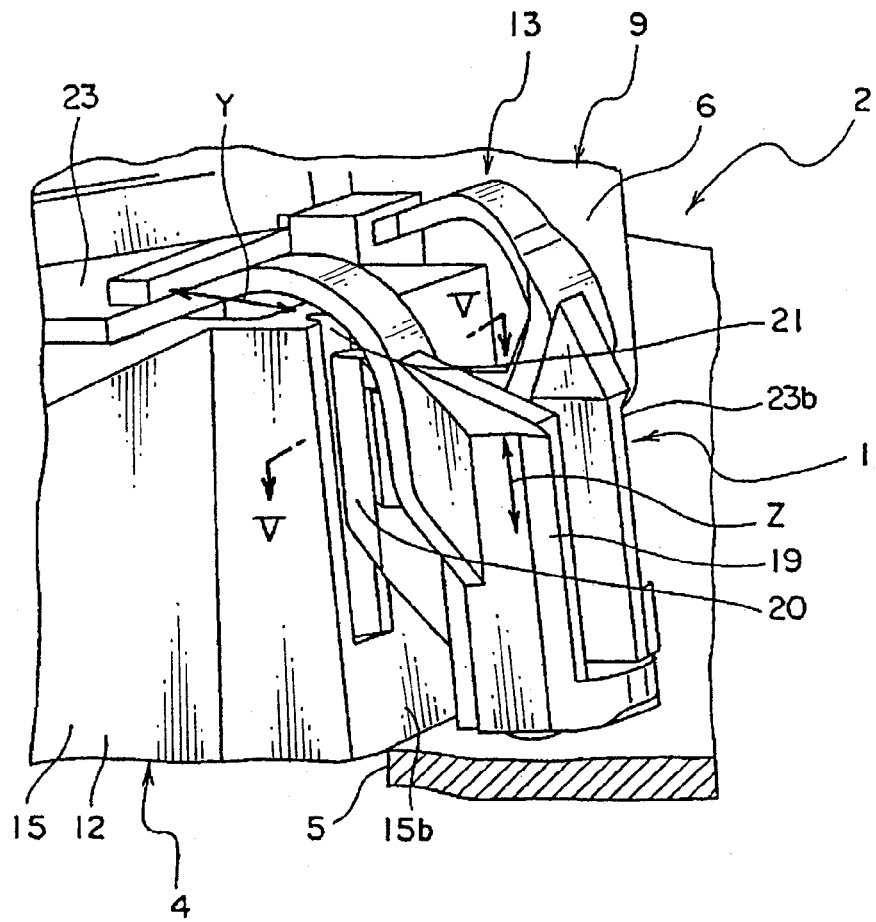
FIG. 4 is a perspective view of the essential part of FIG. 3 viewed with another angle.

A pickup feed device, hereafter referred to as feed device, of the present invention has an urging means to urge an abut portion toward a case so as to hold the abut portion with the case. A distance from a point, where the abut portion is fixed to the case, to a point, where the abut portion contacts a guide portion, is thus reduced so that the abut portion in contact with the guide portion can move without delay with respect to movement of a rack portion.

Thereby, delay movement of a case another end portion with respect to movement of a case one end portion is prevented when the case, or an optical pickup moves. The optical pickup can be minimized with a precise positioning thereof.

A projection portion is disposed on either the abut portion or the case and a recess portion to receive the projection portion is disposed on the other. The abut portion and the case are assuredly fixed together and the delay movement of the abut portion with respect to movement of the case one end portion is prevented when the case, or the optical pickup moves.

The recess portion is tapered toward a bottom thereof. The projection portion is urged toward the bottom of the recess portion with an urging means, so that the abut portion and the case are assuredly held together.

The recess portion has a section of a V shape to receive the projection portion toward the bottom thereof by means of the urging means, so that the abut portion and the case are assuredly held together.

The projection portion is tapered and urged toward the recess portion with the urging means, so that the abut portion and the case are assuredly held together.

The projection portion has a section of a chevron shape to be further received in the recess portion, so that the abut portion and the case are assuredly hold together.

The guide portion can be integrated with the chassis so that a particular part to guide the case can be eliminated and a number of parts can be reduced.

Example

An embodiment of a pickup feed device of the present invention is explained with reference to FIGS. 1-6. A reproducing apparatus 2 such as a CD (compact disc) player, a part thereof shown in FIG. 1, includes an optical pickup feed device 1, hereafter referred to as feed device, to read information recorded in the CD.

The CD player 2 includes a main body and a reproducing portion 4. The main body includes a case (not shown) and a stationary chassis. The case is made of a synthetic resin and has a box shape as an exterior frame of the CD player. The case has an opening for allowing entry and ejection of the CD. The stationary chassis is made of a metal plate and attached to the case.

The reproducing portion 4 is received in the stationary chassis, and includes a movable chassis 8, equivalent to a chassis, made of a metal plate, a rotation table 9 to clamp and rotate the CD, and the feed device 1.

The movable chassis 8 is movably supported with a damper with respect to the stationary chassis or the main body. The movable chassis 8 has a flat portion 3, both surfaces of which are parallel to a bottom wall and an upper wall of the main body. The flat portion 3 has a through-hole 5 extending in a radial direction of the CD clamped with the rotation table 9.

The rotation table 9 includes a table rotatably supported at the center of the flat portion 3, and a spindle motor 6 to rotate the table. The CD is clamped with the table. The spindle motor 6 is attached to the flat portion 3 of the movable chassis 8. The rotation table 9 rotates the CD clamped on the table with the spindle motor 6.

The feed device 1 is attached to the movable chassis 8 as shown in FIG. 1 and includes a lead screw 11 (screw axle), a pickup portion 12, a rack member 13, and a torsion coil spring 14 (urging means).

The lead screw 11 is cylindrical and has a thread groove at its outer surface. The lead screw 11 is rotatably supported about an axis with the movable chassis 8. The through-hole 5 has a pair of opposed inner edge portions 5a, 5b in a circumferential direction of the CD. The lead screw 11 is disposed adjacent to one inner edge portion 5a. The lead screw 11 is rotatably driven by a motor attached to the flat portion 3 of the movable chassis 8.

The pickup portion 12 includes a pickup (optical pickup) to reproduce the information recorded in the disk medium such as the CD, and the case 15 made of a synthetic resin and having a flat box shape.

The case 15 has a window to allow reproducing of the information with the optical pickup. The lead screw 11 is interposed between and threadably engaged with a case one end portion 15a and a rack one end portion 23a. Thereby, when the lead screw 11 is rotated about the axis with the motor, the case 15 is moved in the longitudinal direction of the lead screw 11, that is, the radial direction of the CD clamped with the rotation table 9.

A case another end portion 15b has a case guide portion 16, which has a pair of projections 17a, 17b projecting parallel to one another from an outer surface of the case 15 along a surface of the clamped CD.

The pair of the projections 17a, 17b are spaced one another in a direction perpendicular to the surface of the CD, a direction denoted by an arrow Z in FIG. 1. The another inner edge portion 5b is positioned between the projections 17a, 17b of the case guide portion 16. Thereby, the case guide portion 16 movably supports the case another end portion 15b along the longitudinal direction of the lead screw 11 or the radial direction of the clamped CD.

The case one end portion 15a is threadably engaged with the lead screw 11 and the case another end portion 15b is supported with the another inner edge portion 5b via the projections 17a, 17b of the case guide portion 16, so that the case 15 is supported with the movable chassis 8 and positioned over the through-hole 5. The another inner edge portion 5b of the movable chassis 8 serves as a guide portion and is spaced apart from the lead screw 11.

Figure 6:
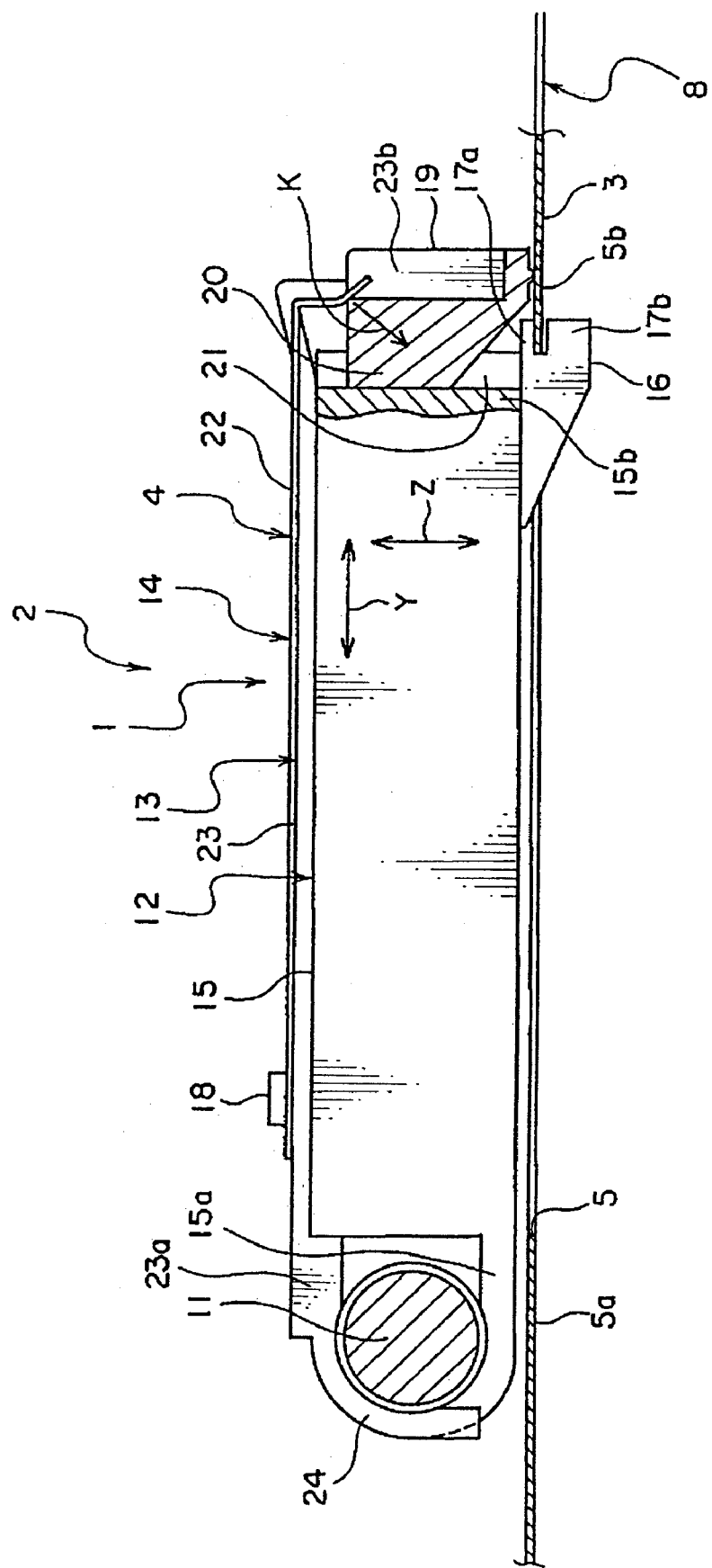
FIG. 6 is a schematic illustration of a section of FIG. 1 taken along VI-VI.

Referring to FIG. 6, the rack member 13 is made of a synthetic resin and a flat plate and integrally includes a rack main body 23, a rack portion 24, and an abut portion 19. The rack portion 24 is thus connected to the abut portion 19. The rack main body 23 is fixed to the case 15 and longitudinally extends in the circumferential direction of the clamped CD.

The rack portion 24 is attached to the case 15 in a manner that the rack portion 24 is disposed on the rack one end portion 23a and threadably engaged with the outer surface of the lead screw 11 together with the case one end portion 15a.

The rack main body 23 is fixed to the case 15 with a screw 18 positioned adjacent to the lead screw 11 as shown in FIG. 6. The rack member 13 is thus slidable in the longitudinal direction of the lead screw 11 together with the case 15. The abut portion 19 is attached to the case 15 in a manner that the abut portion 19 is disposed on a rack another end portion 23b of the rack member 13 and abuts on the another inner edge portion 5b of the movable chassis 8.

The torsion coil spring 14 includes a coil portion and a pair of rod portions 22 (FIG. 1 shows only one rod portion). The coil portion is held between the case one end portion 15a and the rack one end portion 23a. The rod portions 22 are connected to the coil portion. One rod portion 22 (not shown) is connected to the rack one end portion 23a and urges the rack one end portion 23a toward the lead screw 11.

Another rod portion 22 extends from the coil portion toward the rack another end portion 23b and is secured to the rack main body 23 with the screw 18. The another rod portion 22 urges the abut portion 19 in a direction K between Y and Z as shown in FIG. 6, where Y is a direction parallel to the surface of the CD and intersecting the lead screw 11, and Z is a vertical direction. The torsion coil spring 14 urges the abut portion 19 toward the another inner edge portion 5b and the case another end portion 15b.

The torsion coil spring 14 urges the abut portion 19 toward the another inner edge portion 5b of the movable chassis 8 and makes the abut portion 19 and either of the projections 17a, 17b contact the movable chassis 8 so as to prevent movement of the case 15 with respect to the movable chassis 8. The torsion coil spring 14 urges the abut portion 19 disposed on the rack another end portion 23b toward the case another end portion 15b and makes them contact each other so as to prevent delay movement of the abut portion 19, or the rack member 13 with regard to movement of the case 15.

Referring to FIGS. 2-5, the case another end portion 15b has a recess portion 21 and the abut portion 19 disposed on the rack another end portion 23b has a projection portion 20. The feed device 1 thus includes the projection potion 20 and the recess portion 21.

The projection portion 20 is tapered and projects from the abut portion 19 of the rack another end portion 23b toward the case another end portion 15b. The projection portion 20 has a section of substantially an isosceles triangle chevron shape.

The recess portion 21 is recessed and inwardly tapered toward a bottom portion of thereof. The recess portion 21 has a section of a V-shape and allows the projection portion 20 to enter.

When the projection portion 20 is positioned into the recess portion 21, the case another end portion 15b and the rack end another end portion 23b are fixed together. Thereby, the abut portion 19, or the rack member 13 can move without delay with respect to movement of the case 15.

The another rod portion 22 of the torsion coil spring 14 urges the abut portion 19 disposed on the rack another end portion 23b toward the case another end portion 15b, so that the abut portion 19 is fixed to the case 15 and a distance from a point, where the case 15 holds the abut portion 19, to a point, where the abut portion 19 contacts the another inner edge portion 5b (guide portion) becomes shorter. The abut portion 19 in contact with the another inner edge portion 5b moves with the rack one end portion 23a without delay.

Thereby, the rack another end portion 23b, or the abut portion 19 can move without delay with the case one end portion 15a when the case 15, or the optical pickup moves. Thereby, the optical pickup can be accurately positioned even though the screw 18 fixing the rack member 13 and the case 15 is disposed close to the lead screw 11 to minimize the optical pickup.

The abut portion 19 and the case another end portion 15b are assuredly fixed together with the projection portion 20 and the recess portion 21, so that the abut portion 19 can move without delay with respect to movement of the case one end portion 15a when the case 15, or the optical pickup moves.

The recess portion 21 is tapered toward the bottom thereof and has the section of the V shape. The projection portion 20 is urged by the torsion coil spring 14 toward the bottom portion of the recess portion 21, so that the abut portion 19 and the case another end portion 15b are assuredly held together.

The projection portion 20 is tapered and has the section of the chevron shape so that the another rod portion 22 of the torsion coil spring 14 urges the projection portion 20 to guide it inward of the recess portion 21. Thereby, the abut portion 19 and the case anther end portion 15b are assuredly held together.

The another inner edge portion 5b of the movable chassis 8 functions as the guide portion, so that it is not necessary to dispose a particular member to guide the case 15, resulting in reduction of a number of the parts.

Figure 5:
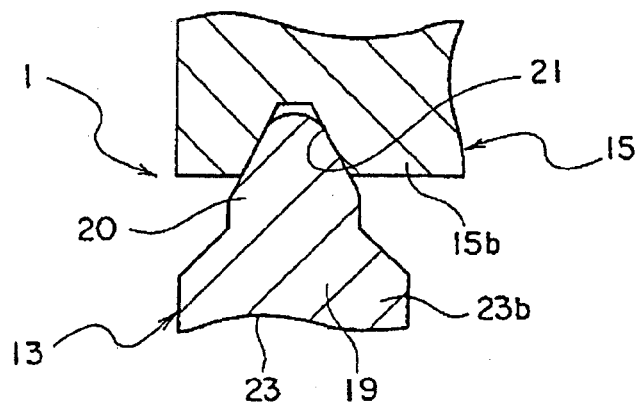
FIG. 5 is a sectional view of FIG. 4 taken along V-V.
Figure 7:
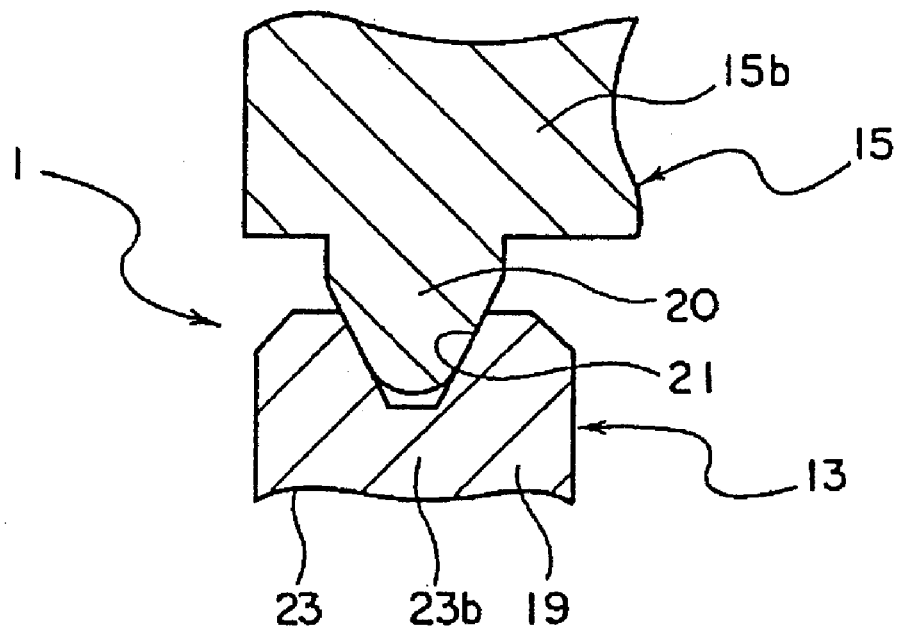
FIG. 7 is a sectional view of an essential part of one alteration of the pickup feed device of FIG. 5.

As shown in FIG. 5, the projection portion 20 is disposed on the rack another end portion 23b and the recess portion 21 is disposed on the case another end portion 15b. It is appreciated that the projection portion 20 is disposed on the case another end portion 15b and the recess portion 21 is disposed on the rack another end portion 23b as depicted in FIG. 7.

Figure 8:
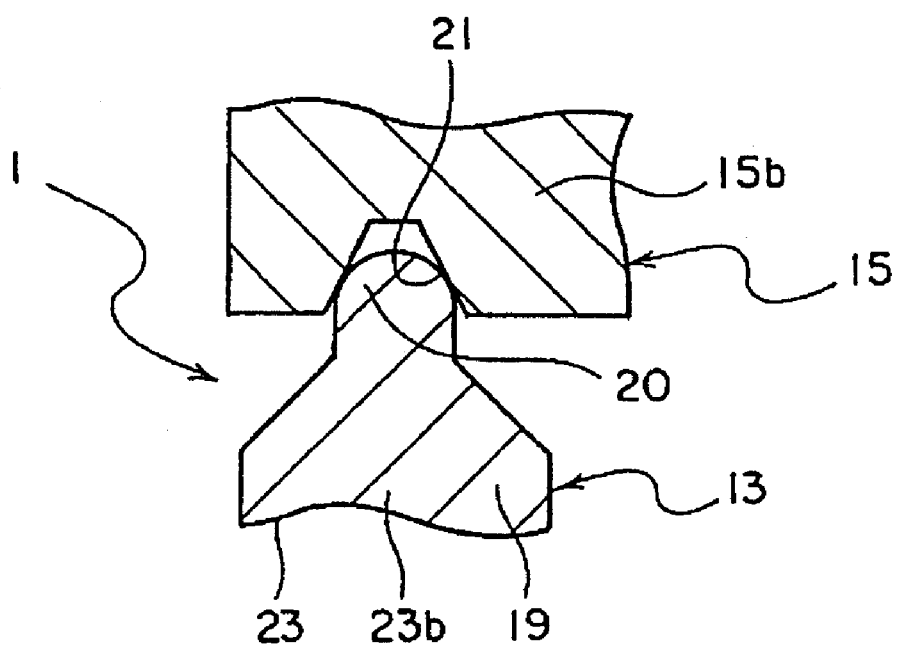
FIG. 8 is a sectional view of an essential part of another alteration of the pickup feed device of FIG. 5.

It is appreciated that the projection portion 20 and the recess portion 21 can have a variety of shapes. FIG. 8 shows the projection portion 20 having a section of a circular arc shape.

It is appreciated that the torsion coil spring 14 as the urging means can be replaced with other springs or a resilient body such as a rubber. It is also appreciated that the rack portion 24 can be separated from the abut portion 19.

The embodiment of the present invention illustrates the case of CD player as an electronic device but can be adapted to a variety of electronic devices.

INDUSTRIAL APPLICABILITY

The pickup feed device 1 of the present invention includes the lead screw 11, the another inner edge portion 5b disposed spaced apart from the lead screw 11, the case 15 receiving the optical pickup, the rack portion 24 attached to the case 15 and threadably engaged with the lead screw 11, the abut portion 19 attached to the case 15 and in contact with the another inner edge portion 5b, and the torsion coil spring 14 urging the abut portion 19 toward the another inner edge portion 5b and the case 15.

The torsion coil spring 14 urges the abut portion 19 toward the case 15, so that the abut portion 19 is fixed to the case 15.

The distance from the point, where the case 15 holds the abut portion 19, to the point, where the abut portion 19 contacts the another inner edge portion 5b (guide portion) becomes shorter. Thereby, the abut portion 19 in contact with the another inner edge portion 5b moves without delay with respect to movement of the case one end portion 15a engaging with the lead screw 11.

Thereby, the abut portion 19 moves without delay during movement of the case 15, or the optical pickup. The present invention provides the accurate positioning of the optical pickup having a small size.

The embodiments of the present invention are only exemplary and not limited thereto, and it should be understood that any modification and alteration of the present invention is in the scope of spirit of the invention.

The invention claimed is:

1. A pickup feed device comprising:
a screw axle;
a guide portion disposed spaced apart from the screw axle;
a case for receiving an optical pickup;
a rack portion attached to the case and engaged with the screw axle;
an abut portion attached to the rack portion and in contact with the guide portion; and
a resilient member for urging the abut portion toward the guide portion in a predetermined direction and toward the case in a direction different from the predetermined direction; and
the abut portion being attached to the rack portion while urged by the resilient member in a width direction between the screw axle and the guide portion.

2. The pickup feed device as claimed in claim 1, wherein the resilient member is in pressure contact with the abut portion.

3. The pickup feed device as claimed in claim 1, wherein the guide portion and the case are disposed without an urging force between the guide portion and the case.

4. The pickup feed device as claimed in claim 1, further comprising:
a projection portion disposed on one of the abut portion and the case; and
a recess portion disposed on an other of the abut portion and the case for accepting the projection portion.

5. The pickup feed device as claimed in claim 4, wherein the recess portion is tapered toward a bottom thereof.

6. The pickup feed device as claimed in claim 5, wherein the recess portion has a section of a V shape.

7. The pickup feed device as claimed in claim 4, wherein the projection portion is forwardly tapered.

8. The pickup feed device as claimed in claim 7, wherein the projection portion has a section of a chevron shape.

9. The pickup feed device as claimed in claim 1, wherein the guide portion is a part of a chassis rotatably supporting the screw axle.

* * * * *